(12) United States Patent
Sankaranarayanan et al.

(10) Patent No.: US 8,126,831 B2
(45) Date of Patent: Feb. 28, 2012

(54) SYSTEM AND METHOD FOR DYNAMICALLY INFERRING DATA PRECONDITIONS OVER PREDICATES BY TREE LEARNING

(75) Inventors: Sriram Sankaranarayanan, Plainsboro, NJ (US); Franjo Ivancic, Princeton, NJ (US); Aarti Gupta, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 748 days.

(21) Appl. No.: 12/236,102

(22) Filed: Sep. 23, 2008

(65) Prior Publication Data

US 2009/0192963 A1    Jul. 30, 2009

Related U.S. Application Data

(60) Provisional application No. 61/023,116, filed on Jan. 24, 2008.

(51) Int. Cl.
*G06N 5/00* (2006.01)

(52) U.S. Cl. .......................................................... 706/45
(58) Field of Classification Search ...................... 706/45
See application file for complete search history.

(56) References Cited

OTHER PUBLICATIONS

Michie, Problem Decomposition and the Learning of Skills, Lecture Notes in Computer Science, 1995, vol. 912/1995, pp. 17-31.*
Piszcz, et al., Genetic Programming: Optimal Population Sizes for Varying Complexity Problems, GECCO'06, Jul. 8-12, 2006, Seattle, Washington, USA, ACM 1-59593-186-4/06/0007, pp. 953-954.*

* cited by examiner

*Primary Examiner* — Wilbert L Starks
(74) *Attorney, Agent, or Firm* — James Bitetto; Joseph Kolodka (57) ABSTRACT

A system and method for inferring preconditions for procedures in a program includes formulating predicates based on inputs to a procedure, including formal arguments, global variables and external environment. Truth assignments are sampled to the predicates to provide truth assignments that lead to a feasible set of input values. Test cases are generated for testing the program in accordance with the truth assignments having feasible sets of input values. The truth assignments are classified to the predicates as providing an error or not providing an error.

16 Claims, 4 Drawing Sheets

```
Method 1  Generate all feasible combinations given
a set of predicates π_1,...,π_N
```
   Input: $\pi_1,\ldots,\pi_N$, satisfiability checker $T$, prop. SAT solver.
   Result: All feasible truth assignments.
   begin
1  | $S := true$          /* Initialize SAT formula */
2  | while ($S$ Satisfiable) do
   |   /* Other termination criteria are possible.  */
3  |   $B :=$ satisfying assignment to $S$
4  |   $\psi := \bigwedge_{B(b_i):T} \pi_i \wedge \bigwedge_{B(b_j):F} \neg\pi_j$
   |   Let $\Psi_c$ enforce the consistency conditions on the input variables.
5  |   if $\psi \wedge \Psi_c$ is $T$-satisfiable then
6  |     Output $B$ as a feasible combination
7  |     $S := S \wedge (\bigvee_{B(b_i):T} \neg b_i) \vee (\bigvee_{B(b_j):F} b_j)$
   |     /* Exclude $B$ from the satisfiable assignments. */
8  |   else                /* $\psi$ is $T$-unsat */
9  |     Let $C$ be the unsatisfiable core.
10 |     $S := S \wedge (\bigvee_{\pi_i \in C} \neg b_i \vee \bigvee_{\neg\pi_j \in C} b_j)$
   |     /* Exclude all extensions of the unsatisfiable core $C$ */
   end

Method 2: ID3Learn: Learn a decision tree.

Input: Partial truth table $T$ over decision variables $V : \{v_1, \ldots, v_k\}$.

Result: A decision tree for $T$.

begin

/* Base Cases   \*/

1    BC1: If all outcomes are "true", create leaf $\boxed{T}$.

2    BC2: If all outcomes are "false", create leaf $\boxed{F}$.

3    BC3: If $V = \emptyset$, return a leaf with the majority outcome.

/* Recursive Step   \*/ begin

4        Choose $v_i \in V$ with max. *Information Gain*

/* Split the table based on $v_i$   \*/

5        $(T_1, T_2) := \text{SplitTruthTable}(T, v_i : T/F)$         /* Recursively learn decision trees for $T_1, T_2$   \*/

6        $D_1 := \text{ID3Learn}(T_1, V - \{v_i\})$ 7        $D_2 := \text{ID3Learn}(T_2, V - \{v_i\})$ 8        output tree $D$ :

end end

FIG. 5

SYSTEM AND METHOD FOR DYNAMICALLY INFERRING DATA PRECONDITIONS OVER PREDICATES BY TREE LEARNING

RELATED APPLICATION INFORMATION

This application claims priority to provisional application Ser. No. 61/023,116 filed on Jan. 24, 2008, incorporated herein by reference.

BACKGROUND

1. Technical Field

The present invention relates to computer program testing and more particularly to system and methods for dynamically inferring preconditions for generating tests 2. Description of the Related Art Data preconditions are used to specify a safe calling environment for an imperative procedure that permits its error free execution. The preconditions are used widely in software engineering practice to support, modularity by formally documenting interfaces. Such preconditions enable reliable integration testing by detecting failures closer to their sources. The preconditions also enable modular verification of large software systems.

We investigate a predicate-based approach to inferring data preconditions for low-level software libraries. The present techniques infer preconditions based on a set of predicates $P=\{\pi_1 \ldots \pi_m\}$ involving the inputs to the procedure. Such predicates may be provided by the user, or extracted automatically from the procedure description.

Given a procedure and a set of predicates, predicate complete enumeration is performed to explore all the theory feasible truth assignments to the predicates. For each feasible truth combination, we derive a corresponding test case(s) to the procedures that satisfy each predicate or its negation depending on the truth assignment. The resulting executions of the test case are classified as erroneous, if at least one execution leads to a failure, or is error free, if all executions succeed. After enumerating all the feasible truth combinations of the input predicates, we obtain a truth table that classifies the truth assignments to the predicates as erroneous or error-free. Such a table represents a Boolean function over the truth assignments that predict the occurrence of an error. Expressing this Boolean function as a formula involving the predicates $\{\pi_1 \ldots \pi_m\}$ yields the needed truth combination.

If the number of predicates is large, however, a complete enumeration of all the truth value combinations is not feasible. Therefore, a statistical sampling technique is provided by combining randomized and deterministic SAT solvers with a theory satisfiable checker. A sampling technique produces a near-uniform sampling of the feasible truth values. By executing the test cases obtained from the feasible truth combinations, it is possible to classify the sampled truth combinations as erroneous or otherwise, resulting in a partial truth table. We then use a decision tree learning technique to learn a Boolean function that predicts error-free execution.

A system and method for inferring preconditions for procedures in a program includes formulating predicates based on inputs to a procedure, including formal arguments, global variables and external environment. Truth assignments are sampled to the predicates to provide truth assignments that lead to a feasible set of input values. Test cases are generated for testing the program in accordance with the truth assignments having feasible sets of input values. The truth assignments are classified to the predicates as providing an error or not providing an error.

A system implemented on computer readable medium comprising a computer readable program for inferring preconditions for procedures in a program includes a program instrumenter configured to instrument a program with variables to track properties of the program to formulate predicates which are derived from the variables and based on inputs to a procedure, including formal arguments, global variables and external environment. A satisfiability solver and theory solver are employed in combination to randomly sample truth assignments to the predicates to provide truth assignments that lead to a feasible set of input values. A test case generator is configured to test the program in accordance with the truth assignments having the feasible sets of input values and to classify the truth assignments to the predicates as providing an error or not providing an error. A decision tree learning method is configured to infer preconditions on the inputs to the procedure based upon classified truth assignments.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, systems and methods are provided to learn data preconditions for procedures written in an imperative programming language. Given a procedure and a set of predicates over the procedures inputs, the present techniques enumerate different truth assignments to the predicates, deriving test cases from each feasible truth assignment. The predicates are provided by a user and/or automatically produced from a program description using heuristics. The enumeration of truth assignments is performed by using randomized SAT solvers with a theory satisfiability checker capable of generating unsatisfiable cores.

For each combination of truth values chosen by a sampler, the corresponding set of test cases are generated and executed. Based on the result of the execution, the truth combination is classified as "safe" or "buggy". Then, a decision tree classifier is employed to generate a Boolean formula over the input predicates that explains the truth table generated in this process. The resulting Boolean formula forms a precondition for the function under test.

The present embodiments may be applied on a wide variety of functions, including functions in a standard C library. Experiments show that the present learning technique is robust. In many cases, it successfully learns a precondition that captures a safe and permissive calling environment needed for the execution of the function.

Given a procedure, either in the form of source code or executable, the present principles systematically derive a data precondition using statistical techniques such as sampling and machine learning that characterize input values for which the procedure may be safely executed. This is applied to software libraries to derive precondition contracts. Tests are run based on different truth assignments to some predicates over the inputs and a tree learner is employed to infer preconditions based on the results of the test.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Figure 1:
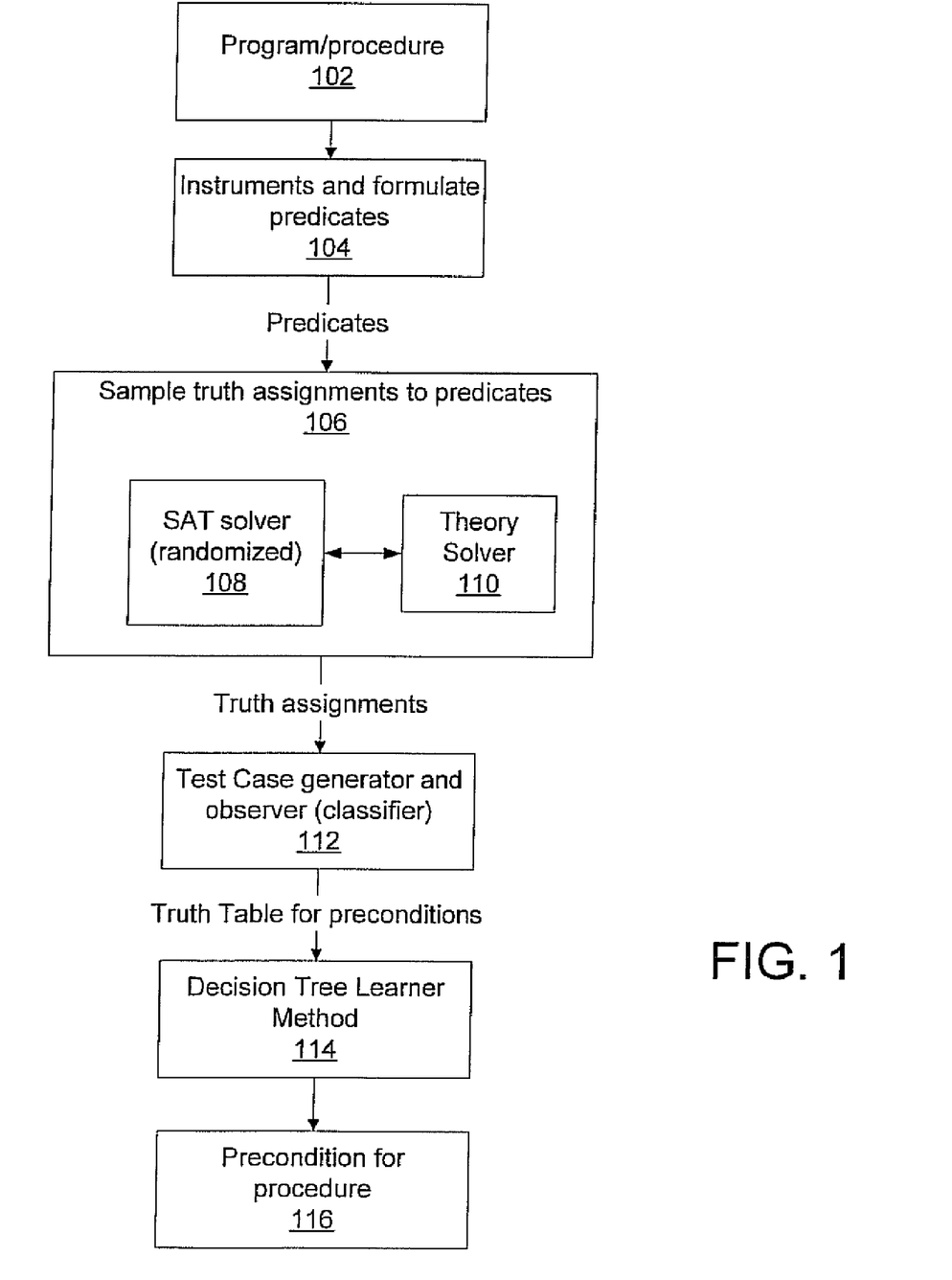
FIG. 1 is a block/flow diagram showing a system/method for inferring preconditions of a program (procedure) in accordance with one illustrative embodiment.

Referring now to the drawings in which like numerals represent the same or similar elements and initially to FIG. 1, a block/flow diagram showing a system/method for dynamically inferring data preconditions over predicates by tree learning is illustratively shown. In block 104, predicates are formulated based on the inputs to a procedure 102. The procedure 102 may be a program a subroutine or any other coded program or method. Block 104 adds instrumentation variables to track array lengths, string lengths, contents, sentinels, etc. for pointers in the procedure 102. These structures play a role in the final precondition. Predicates are derived automatically from the instrumentation variables by means of simple heuristics. One such heuristic is to use all pair-wise comparisons of integer variables, all pair-wise aliasing between pointers and sign predicates for the variables.

In block 106, a combination of a SATisfiability (SAT) solver 108 checking over a propositional satisfiability problem and theory satisfiability checker 110 to enumerate and/or randomly sample the truth assignments to the predicates derived in block 104. Truth assignments are only derived which lead to some feasible set of input values for the program. The combination of the SAT solver and the theory satisfiability checker perform an enumeration of all truth values, and preferably randomize this process by using a randomized SAT solver.

In block 112, with the feasible truth assignments derived in block 106, many tests are run on the procedure (program) using the values that satisfy each truth assignment. Based on the tests, each truth assignment is classified to the predicates as one leading to an overflow or a safe combination. This may also be done using formal or semi-formal reasoning techniques instead of testing.

In block 114, the outcomes of the tests run in block 112 are employed to formulate a truth table and a decision tree learner is employed to infer preconditions based on the results of the tests. The preconditions 116 are output for the procedure 102.

The present embodiments formulate a set of predicates and instrumentation variables in order to express aliasing, allocation lengths and string lengths of the arrays and pointers that are input to a function; and predicates that compare these quantities against each other. Using the set of predicates, the present embodiments perform a statistical sampling (complete enumeration possible) to sample a fixed number of truth assignments to the predicates that are feasible. For each enumerated truth assignment, a set of test cases is derived that are used to execute or analyze the procedure. We classify each test as leading to a crash or otherwise. This leads to a truth table that associates each truth assignment with the possibility of a crash or otherwise. Given such a truth table we learn a Boolean function that explains the truth table using a decision tree learning method.

Learning preconditions can have at least the following benefits. Learning preconditions modularizes program verification by automatically deriving contracts for functions whose source code may not be available or may be too complex to analyze statically. Learning preconditions enables better debugging by adding assertions that reveal errors closer to their sources. The present approach samples the space of predicates to provide a better basis (better coverage) for the learning problem. The present methods can work in situations where the source code is unavailable. In fact, the methods use minimal reasoning over the source code. This makes it language independent and robust against quirks due to compiler optimizations.

In addition, the present approach employs a statistical technique for deriving data preconditions of procedures that works directly on library implementations.

The truth tables are derived based on predicates that potentially predict the possibility of an erroneous execution, and use tree learning to learn a data precondition that is very accurate in many practical applications. The decision tree learning picks out the relevant features that control the function behavior. This can be used for further investigation of the function using more heavyweight formal approaches.

Figure 2:
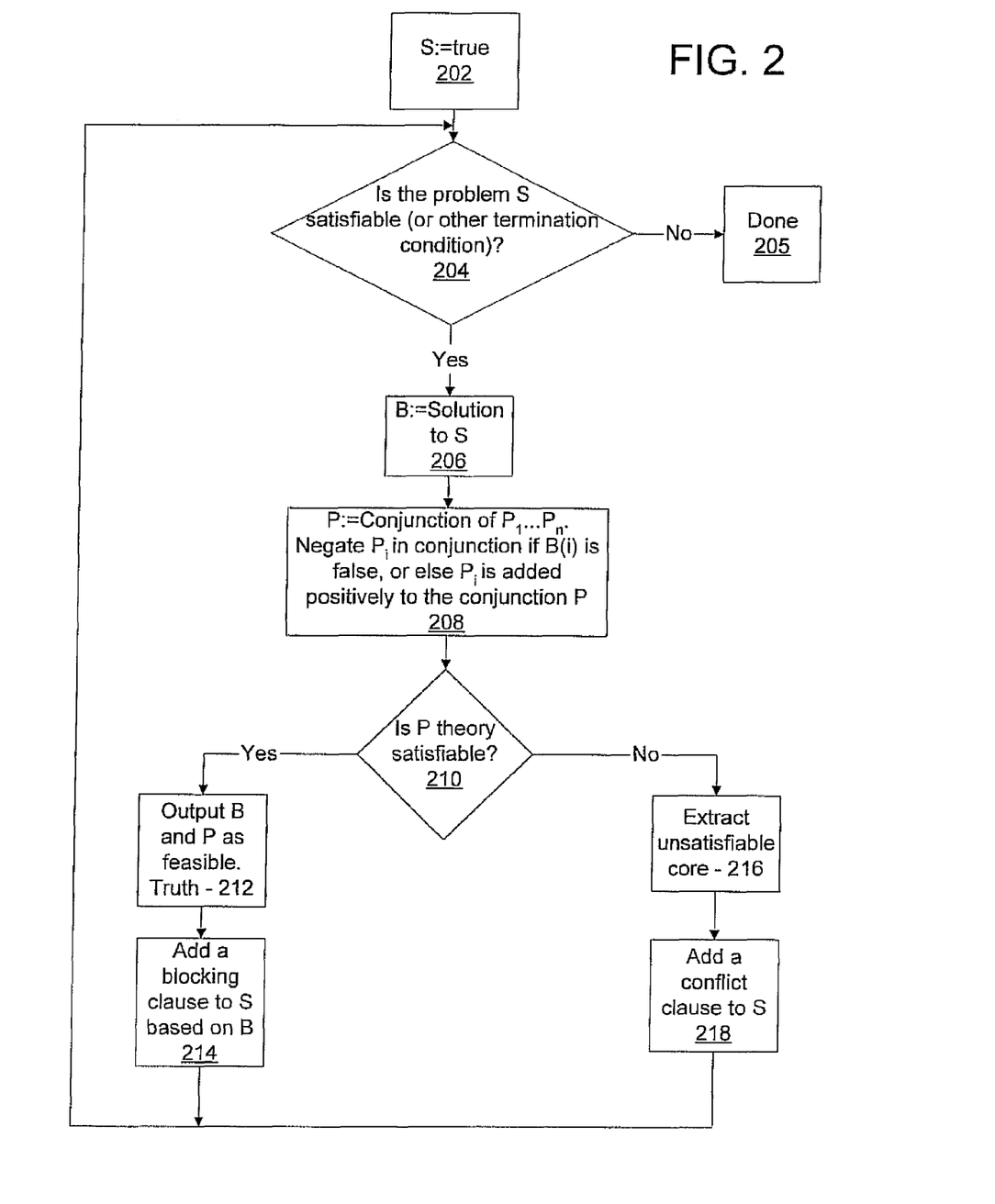
FIG. 2 is a block/flow diagram showing a system/method for determining truth assignments in accordance with one illustrative embodiment.

Referring to FIG. 2, a block/flow diagram showing a system/method for performing truth assignment enumeration (block 106, FIG. 1) is illustratively depicted. In block 202, a propositional satisfiability problem (S) is set or initialized to true. In other embodiments, S may be initialized to false. In block 204, a check on whether the propositional satisfiability problem (S) is satisfiable (or other termination condition) is performed. If the condition is not met or unsatisfiable, the path is exited in block 205. Otherwise, the solution of S is set equal to B in block 206.

In block 208, P is equal to a conjunction of predicates $(P_1 \ldots P_n)$. $P_i$ (for the $i^{th}$ predicate) is negated in the conjunction if B(i) (the values of B for the $i^{th}$ predicate) is false, or else $P_i$ is added positively to the conjunction P. In block 210, P is checked to determine if it is theory satisfiable. If yes, output B and P as feasible in block 212. Then, in block 214, add a blocking clause to S based on B. If in block 210 P is not theory satisfiable, extract the unsatisfiable core C in block 216, and add a conflict clause to S in block 218.

The program path returns to block 204 until all S's have been addressed. The method determines true assignments to each predicate $(P_i)$ as described with respect to FIG. 1. More details and illustrative examples will now be provided to further describe the present principles.

Example 1 shows program code for a store copy (strcpy) function.

EXAMPLE 1

```
1: char * strcpy (char * a, char * b) {
2:   char * c = a, *d = b;
3:   while (*d) *c = *d++;
4:   return a;
5: }
```

Example 1 is an unoptimized implementation of the standard library string function strcpy. The optimized implementation is part of the built-in C library, and is more complex. The correct implementation of the function requires that pointers a, b point to proper null-terminated strings and that the string length of b be less than the array length of a. The overall approach includes three major components: (a) adding instrumentation variables and predicates on which the precondition will be based, (b) enumerating (sampling) feasible truth values of the predicates and running test cases, and (c) learning the precondition from the (partial) truth table. The basic approach is provided to learn the appropriate precondition for guaranteeing overflow-free execution of the strcpy function.

Instrumentation Variables and Predicates: We add instrumentation variables to represent the allocated bounds for the pointer and the position of its null terminator character, i.e., its string length. As a result of this instrumentation, we have four integer variables strLen(a), strLen(b), fwdBnds(a), fwdBnds(b) representing the string lengths and the bounds for the pointers a, b, respectively. In effect, these variables are treated as the de-facto inputs to the function strcpy. We may also assign magic number addresses to the pointers a, b to also allow for the possibility of their aliasing each other. Such considerations are ignored for the time being.

The predicates used in the preconditions involve the input variables to the procedure, including the associated instrumentation variables for string/array length (strLen is for string length and fwdBnds is for forward bounds). These may be directly provided by the user or derived heuristically from the program text. In practice, we use heuristics to arrive at such predicates. One simple and effective heuristic involves adding predicates of the form i−j≦0, i≦0, i≧0, for all integer inputs i, j to the program. For this example, we use the following predicates:

$\pi_1$: strLen(a)=0
$\pi_2$: strLen(b)<strLen(a)
$\pi_3$: fwdBnds(a)≦strLen(a)
$\pi_4$: fwdBnds(b)≦strLen(b)
$\pi_5$: fwdBnds(a)≦strLen(b)

Truth Assignment Enumeration. The goal of the enumeration is to consider all possible truth values to the predicates $\pi_1, \ldots \pi_5$. Given 5 predicates, we may have as many as 32 truth combinations, however, not all combinations are feasible. For example, consider a truth combination that sets $\pi_2$: False (F), $\pi_3$: False (F), $\pi_5$: True (T) (the other predicates may have arbitrary truth values). Such a truth combination are infeasible, since the corresponding assertion strLen(b) ≧strLen(a) ∧fwdBnds(a)>strLen(a) ∧fwdBnds(a)≦strLen (b) ∧... is unsatisfiable in the theory of integer arithmetic. On the other hand, the combination $\pi_1$: T, $\pi_2$: F, $\pi_3$: F, $\pi_4$: F, $\pi_5$: T is feasible. It is satisfied by the valuation strLen(a)=0, fwdBnds(a)=10, strLen(b)=5, fwdBnds(b)=4.

The valuation of variables corresponding to a feasible truth combination can be converted into a test case that initializes parameter a to a valid array of size 10 and string length 0, and b to an array of size 4 and string length 5l (obtained by setting all elements of b to non-null characters). Running the procedure on these inputs leads to an overflow since b is no longer a null terminated string. Along these lines, it is possible to enumerate all the feasible truth combinations of the predicates, classifying each as leading to an overflow or otherwise. Table 1 shows the partial truth table for some feasible truth combinations.

TABLE 1

Truth Table for overflow violations using predicates $\pi_1 \ldots \pi_5$ for the strcpy function:

| $\pi_1$ | $\pi_2$ | $\pi_3$ | $\pi_4$ | $\pi_5$ | Overflow? |
|---|---|---|---|---|---|
| F | F | F | F | F | F |
| F | T | F | T | F | T |
| T | F | F | T | T | T |
| F | T | F | F | F | F |
| F | F | F | T | T | T |
| F | T | T | F | F | T |
| F | F | F | T | T | T |
| ... | ... | ... | ... | ... | ... |

The overflow result corresponding to infeasible truth combinations are treated as logical "don't cares". The Boolean function ($\pi_3 \lor \pi_4 \lor \pi_5$) provides the simplest explanation of the complete truth table, i.e., it predicts the overflow status for all feasible truth combinations correctly. This yields the precondition for overflow-free execution:

$\neg$(fwdBnds(a)≦strLen(a)
$\lor$ fwdBnds(b)≧strLen(b) $\lor$ fwdBnds(a)
≦strLen(b))

The precondition requires that a, b be properly null-terminated and that the array length of a be larger than the string length of b. It corresponds to the man-page specification for the strcpy function.

We differentiate two types of specification inference based on the nature of the specifications inferred:

Control Preconditions: Temporal specifications that characterize the allowable or forbidden sequences of function calls.

Data Preconditions: Specifications that characterize the permissible input values at the call to each function, in isolation.

The modular nature of function calls guarantees that their execution depends purely on the state of the program at the function call, rather than the history of previous calls or state transitions performed by the system. Therefore, if the calling environment for a procedure is known, i.e., all its inputs are characterized and we have a formal language that is expressive enough, data preconditions alone can adequately specify the environment at the function call, without referring the sequence of function calls that produce such an environment. Control and Data preconditions are useful in different contexts: certain types of libraries are best specified using data preconditions whereas others may call for control preconditions.

EXAMPLE 2

Consider the string library function strcpy. In general, the correct calling convention for such a function is best described by a precondition on its inputs. In fact, temporal formalisms cannot specify the library usage naturally and succinctly. Consider, on the other hand, the correct sequence of calls to the functions on a thread_t object in the Pthreads library. To perform a pthread_join operation on a thread_t object, we need that the thread be initialized and started using the pthread_init function, and that every lock acquired by the calling thread be released by calling unlock. The precondition to pthread_join could be specified by means of the correct relations between the fields of the thread object, different locks potentially held by the thread and the other thread scheduler data structures. This could be quite cumbersome, however. In practice, the library is best specified as a permissible temporal sequence of calls.

Inferring Specifications. Inferring both control and data preconditions for APIs, on client code or library code, using static/dynamic techniques and based on formal analysis of the program or on statistical methods may be provided. Note that with very few exceptions a majority of the statistical methods focus on learning temporal relationships between function calls and their arguments. The usage sequences mined from libraries and applications have been used to construct static as well as dynamic checks on the library. On the other hand, the present technique as presented herein considers predicates solely at the inputs to the program. This restriction can be relaxed if we are able to instrument different program points with predicates of interest. Secondly, due to the machine learning used at the background, our technique uses random sampling of truth assignments. Under the assumption that the number of predicates that dictate bug-free behaviors are few in number, our technique can robustly infer preconditions by sampling a small set of truth assignments.

Randomized Unit Testing. Our approach uses randomized SAT solvers to sample from the space of truth assignments to a set of predicates. Randomization is used in lieu of an exhaustive exploration of the space of all inputs/calling patterns. Simplicity and ease of implementation are the essential advantages to random testing.

Decision Tree Learning. Data preconditions for functions generally have a non-trivial Boolean structure. They tend to involve disjunctions, conjunctions and negations of simpler relations among the variables of the program. The present approach fixes these relations a priori and allows for an arbitrary Boolean combination of the predicates representing these relations. Therefore, we employ a decision tree learning technique to infer a Boolean function given a partial truth table describing the function.

Environment Models and Predicates: Low level imperative programs written in a language such as C/Pascal with basic data types such as integers, floating points, characters along with arrays/pointers at various levels of indirections are illustratively described. We assume for simplicity that all the inputs (and their types) to the procedure under consideration are known in advance. Unless otherwise mentioned, we will work under a black box setting, i.e., the procedure is available for execution in the object form but the source code is not necessarily available.

Pointer/Array Attributes. Various attributes are associated with the pointers and arrays used as inputs to the present procedures/methods. With each array/pointer q, we associate integer variables to track its address, allocated bounds, string length, element ranges, and other important attributes that may influence the error-free execution of the procedures. The actual attributes themselves may vary with the application. For example, the string length attribute may be meaningless to a function that sorts the elements of a given array.

Address: Each pointer is provided with a magic number denoting its address. The address numbers do not correspond to the virtual/physical pointer address in the memory layout. It is used simply as a means of tracking aliases among the various pointers.

Forward Bounds: The forward bound of a pointer p of a type t tracks the indices i for which the C language expression q[i] may be safely evaluated without a memory overflow. The forward bound for a pointer/array q will be tracked in the variable fwdBnds(q). It follows that for any pointer q, fwdBnds(q)$\geq$0.

String Length: The string length for a character pointer denotes the index of the earliest occurrence of a null terminator character. It is tracked by the variable strLen(q). By convention, we treat a string as null terminated if strLen(q) <fwdBnds(q) and improperly terminated otherwise.

Element Ranges: Additionally, we track the interval range eltRng(q) in which all the elements q[i] lie. For string pointers, this range is assumed not to include the null terminator character if the string is properly null terminated.

Sentinels: Most applications may require sentinel variables to track the positions of special variables such as "/", "*", and so on. It is also possible to use sentinels that track the occurrence of the value stored in a variable c inside an array a and so on.

We consider two pointers to be aliased if they have the same address. Aliased pointers share the same values for all the attributes mentioned above. For simplicity, we disallow pointers whose allocated extents overlap. In other words, it is not possible for two non-aliased pointers to have overlapping extent.

Calling Environment: The calling environment for a procedure with base-type inputs and pointer inputs $q_1, \ldots q_n$ includes valuations to the variables $v_1, \ldots v_m$, address valuations to the pointers $q_1, \ldots q_n$ and finally, integer values to the instrumentation variables corresponding to each pointer $q_i$: fwdBnds($q_i$), strLen($q_i$) and eltRng($q_i$).

Functions in C/Pascal may also depend on global variables, parameters such as time, random numbers, inputs read from the user and so on. We assume that all such inputs are part of the calling environment above. Since, we are primarily concerned with the error/error-free behavior of the function; its side effects do not matter. However, in many cases illegal calling environments may cause error flags to be set that affect later calls to the functions. Such libraries are best treated using techniques that learn API call sequences rather than through data preconditions.

Predicates: We use predicates over the variables in the calling environment to represent properties of a given calling environment. The use of such predicates is useful to our testing/precondition-learning scheme. These input predicates $\pi_1 \ldots \pi_m$ can be specified by the user. On the other hand, specifying an adequate set of predicates is hard to achieve without knowledge of the procedure's workings. Therefore, the present technique automatically arrives at a set of predicates over the input variables using some heuristics. One of the common observations about programs that manipulate arrays and strings is that the relative sizes of the arrays, strings and their ranges matter most to the working of the program. Secondly, these relations are, as a rule, quite simple in form. In most cases, they include direct comparisons of the form i$\leq$j, i=j and so on. We use the following default scheme for arriving at predicates given input integers $i_1 \ldots i_m$, pointers $q_1 \ldots q_m$, and the associated variables strLen($\bullet$), fwdBnds($\bullet$) and so on.

Base value comparisons: All pair-wise comparisons of the form $a_i \leq a_j$, where $a_i$, $a_j$ may be integer variables such as $v_1 \ldots v_m$ or instrumentation variables such as strLen($q_1$), fwdBnds($q_1$) . . . .

Zero Comparisons: We add predicates such as $v_i \leq 0$ and $v_i \geq 0$ for each integer/char/float variable $v_i$.

Pointer address comparison: We consider all pair-wise alias relationships between pointers $q_i = q_j$ and so on.

Magic Numbers and Flags: In many cases, inputs may be used to perform case distinctions inside the code. As a result, magic numbers may carry special meanings. Therefore, we may also add bit-wise predicates on inputs such as BitSet(x,n) that asserts that the $n^{th}$ bit of the input variable x is set. Doing so, necessitates reasoning over bit-vector theories.

Element Memberships: We may also add membership predicates such as $x \in ArrayElts(q)$ to denote that the value stored in the variable x is an element of the array q.

The consistency requirements for pointer aliasing provide that whenever two pointers alias, i.e., $q_i$ holds, we also make their instrumentation variables have the same values, i.e., $fwdBnds(q_i) = fwdBnds(q_j)$, $strLen(q_i) = strLen(q_j)$ and so on. This can be expressed using the logical formula:

$$\Psi_c : \bigwedge_{i \neq j} (q_i = q_j) \Rightarrow (fwdBnds(q_i) = fwdBnds(q_j) \wedge \ldots).$$

Let $\pi_1 \ldots \pi_N$ represent a suitable set of predicates derived using some of the heuristics described above. We use predicates to represent sets of calling environments. Under some calling environment including a valuation to the input variables, pointers and their instrumentation variables, the predicate $\pi_i$ evaluate to truth value T if it holds on the calling environment and F otherwise. Such an assignment of Boolean values to the predicates is a truth assignment. On the other hand, not every truth assignment represents a calling environment. Consider, for instance, $\pi_1$: a>b, $\pi_2$: b>c and $\pi_3$: a>c. The combination of $\pi_1$, $\pi_2$: T and $\pi_3$: F leads to the unsatisfiable assertion a>b $\wedge$ b>c $\wedge$ a$\leq$c.

Furthermore, certain combinations of truth values may not lead to consistent environments. Consider the predicate $\pi_1$: q=r and the predicate $\pi_2$: $fwdBnds(q) \leq fwdBnds(r)$. According to the consistency condition $\Psi_c$ above, it is not possible for the combination $\pi_1$: T and $\pi_2$: F to yield a consistent combination of truth values, even though $\pi_1 \wedge \neg \pi_2$ is satisfiable. An assignment of truth values which represents no (consistent) calling environment is said to be infeasible.

Under the assumption that $\pi_1 \ldots \pi_N$ (include the set of possible indicators of whether a calling environment leads to the safe execution or not, we seek to execute the program for each possible combination of truth values of $\pi_1 \ldots \pi_N$. However, not every possible combination of the predicates yields a feasible calling environment Therefore, we first consider techniques for enumerating all feasible truth values for the given set predicates.

Enumerating All Feasible Combinations: Given predicates $\pi_1 \ldots \pi_N$, drawn from a theory T such as linear arithmetic, we wish to generate all the feasible truth values for them. Corresponding to the predicates $\pi_1 \ldots \pi_N$, we introduce the Boolean variables $b_1 \ldots b_N$ to represent truth values for the predicates. By convention, assigning $b_i$ to T represents $\pi_i$ and F represents $\neg \pi_i$. Let B: $\{b_1, \ldots, b_N\} \rightarrow \{T, F\}$, be a truth assignment. Such an assignment represents the conjunctive formula:

$$\Psi(B) : \bigwedge_{B(b_j): T} \pi_i \wedge \bigwedge_{B(b_i): F} \neg \pi_j$$

A truth assignment B is feasible if $\Psi(B)$ is satisfiable in the theory T. We seek to enumerate all feasible truth assignments.

A naive approach to this problem considers all possible truth assignments B, enumerating $\Psi(B)$ for T-satisfiability in each case. However, such an approach is impractical since it requires $2^N$ satisfiability queries. In theory, such a cost is unavoidable since there may be an exponential number of feasible truth assignments in the first place. However, in practice, we find that the number of feasible combinations while exponential in N still remains much smaller than $2^N$. We present a technique using a combination of SAT solvers and T-satisfiability checker generating unsatisfiable cores. Such a technique learns conflict clauses from unsatisfiable instances, seeking to avoid generating them again in practice.

Figure 3:
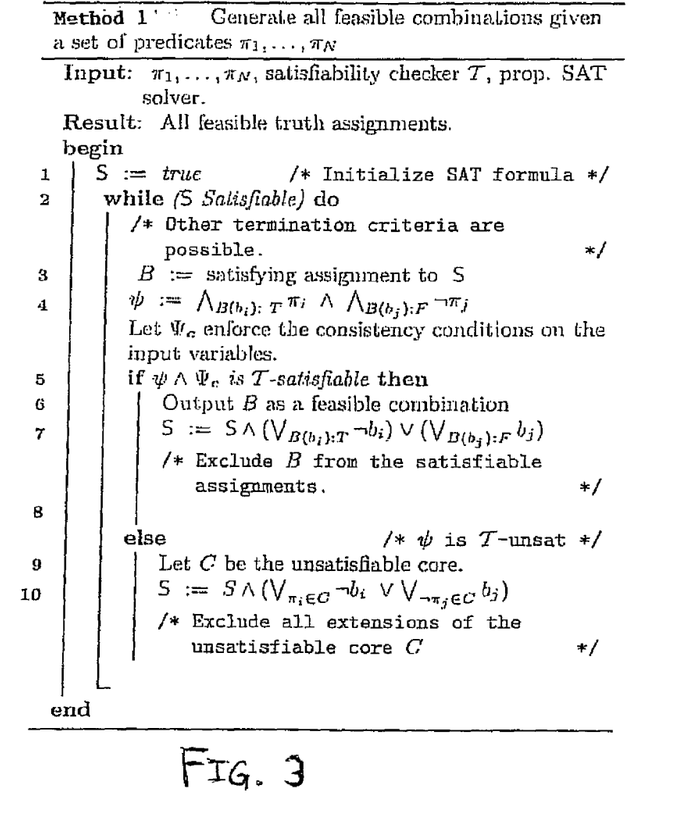
FIG. 3 shows an illustrative method for generating all feasible combinations given a set of predicates in accordance with one embodiment.

The enumeration scheme is shown in FIG. 3. FIG. 3 maintains a conjunctive normal form (CNF) SAT formula S over the variables $b_1, \ldots b_N$ representing all the truth combinations that are yet to be considered in the enumeration. At each enumeration step, we use a SAT solver to find a satisfiable solution B for S.

Failing to find a solution signifies that all feasible combinations have been enumerated, and therefore the enumeration may terminate. Otherwise, we check the Tsatisfiability of the formula $\Psi(B) \wedge \Psi_c$ obtained by translating B as a conjunction of predicate-literals. Note that $\Psi_c$ enforces the non-negativity of variables such as $fwdBnds(q_i)$ and the consistency of pointer instrumentation variables for aliased pointers. If $\Psi(B) \wedge \Psi_c$ is satisfiable, we output B as a feasible truth assignment. Furthermore, in order to rule out B from future enumerations, we add a suitable clause to the formula S. On the other hand, if $\Psi(B) \wedge \Psi_c$ is unsatisfiable, we may add a new clause based on the unsatisfiable core C of $\Psi(B)$. The clause rules out the current truth assignment B or any other assignment B' that is compatible with the unsatisfiable core C.

The enumeration Method 1 in FIG. 3 enumerates all the feasible truth assignments. Even though it is possible to enumerate all the truth assignments, it may not be practical to do so. In theory and in practice, the number of feasible truth assignments grows exponentially in the number of predicates. More significantly, most of the effort is wasted since we have observed that, in practice, many of the predicates that we choose to add do not have a bearing on the error-free execution of the procedure. Unfortunately, however, it is equally hard to reliably detect predicates that do affect the error-free execution of the program.

A simple solution is to terminate Method 1 in FIG. 3 after some fixed number of feasible solutions have been produced. SAT solvers based on systematic state-space search such as Zchaff, MiniSAT and so on, produce nearby solutions on each run and therefore have a significant bias in the set of solutions produced. In other words, the truth assignments produced represent a small set of nearby assignments in the space of all solutions. Using such assignments in our testing/learning incorporates a significant bias that affects the learned precondition rather adversely.

Therefore, instead of enumerating all the feasible truth assignments, we choose to sample a fixed number of feasible truth assignments at random. Under the assumption that the number of truth assignments that affect the execution of the program is small, the randomly chosen assignments will include all the possible assignments to the unknown predicates. As a result, it will be possible for a machine learning method such as decision tree learning to detect, these predicates and also learn the precise Boolean function that predicts the outcome of the execution given a truth assignment to the predicates.

Sampling Feasible Assignments: A sampling scheme employs a SAT solver that given a SAT formula S either detects unsatisfiability or chooses a solution uniformly at random from among all the possible solutions. Method 1 of FIG. 3 is used in our sampling scheme with a few modifications. First of all, the termination criterion of the while loop in line 2 of the program is augmented to sample a fixed number of feasible truth assignments. Furthermore, the satisfiable solution in line 3 is obtained using a randomized SAT solver. To see why method 1 would sample uniformly at random, let us represent the set of all unexplored feasible truth assignments after some j>0 rounds of sampling by the set $F_j$ and the remaining unexplored infeasible assignments by $I_j$. At each execution of the loop body, the formula S represents the assignments in $F_j \cup I_j$. At each sampling step, the satisfying assignment B chosen in line 3 can belong to $F_j$ or $I_j$. 1) If $B \in F_j$, then it is in effect chosen uniformly at random from the set $F_j$. Furthermore, $F_{j+1}=F_j-\{B\}$. 2) If $B \in I_j$ no sample is generated and the set $F_j$ is unaffected.

Method 1 implemented using a randomized SilT solver samples uniformly at random (without replacement) from the set of all feasible truth assignments. In practice, we need a SAT solver that is capable of producing a solution uniformly at random from the set of all solutions.

Test Generation: So far, we have presented a scheme to use a combination of propositional satisfiable and theory solvers to enumerate/sample all the feasible truth assignments. From each feasible truth assignment, we extract a theory formula $\Psi(B)^\wedge\Psi_c$. From such a formula, we obtain valuations to the base type variables, pointers and the associated instrumentation variables for length, string length and element ranges. From these valuations, we generate a test environment and categorize the results of the test in a truth table. Given a set of pointer addresses, forward bounds, element ranges and string lengths (for string pointers), we set up an initial environment by dynamically allocating regions of the required lengths, randomly generating elements in the chosen range and setting a null terminator character based on the value of the string length.

Since the model needs aliased pointers to have the same value of these attributes, doing so presents no conflicts. After preparing the pointers based on the instrumentation variables, and setting the values of the basic variables, we call the procedure under test with the generated input environment. The resulting execution is classified based on the feature that is under evaluation. In this instance, we classify the execution itself as a crash (erroneous) or error-free.

In practice, we generate many solutions given a particular truth assignment and run tests for each one of them. By convention, we classify the truth assignment as erroneous if at least, one of the execution causes an error. Otherwise, the assignment is labeled error free. Using the enumeration sampling procedure and the associated tests run at each stage, we may classify every feasible truth assignment as being erroneous or error-free. The resulting classification gives rise to a (partial) truth table.

Decision-Tree Learning: Given a (partial) truth-table that associates a truth value to a target concept (did the program crash?) with each truth assignment to a set of Boolean variables (truth assignment to the predicates on the input model), we wish to learn a "simple" Boolean function that explains the given partial truth-table. Note that such a "simple" function may not explain the truth-table completely. While it is possible to learn a function that describes the table accurately, such a function may be too complex and depend on the particular sample that was used to generate the table. Our approach is to learn a simple decision tree that (a) involves as few predicates as possible, (b) can be described simply with as few bits as possible. Doing so, we also wish to achieve the maximum possible accuracy over the rows of the truth table.

In practice, since the underlying concept frequently satisfies assumptions (a,b), we may achieve a high level of accuracy using a machine learning method biased towards "simpler" Boolean functions.

Decision Trees: Decision trees are commonly used representations for Boolean functions. A decision tree is a binary tree, wherein each internal node is labeled with a Boolean (decision) variable. Each node has two children corresponding to the truth assignments "true"/"false" to the variable labeling the node. Each leaf of the tree is also labeled true/false, and refers to the outcome corresponding to the truth assignments in the branch leading from the leaf back to the root of the tree. We make each branch of the tree have at most one occurrence of a variable. If a variable is missing from a branch, we assume that the outcome along the branch holds for either truth assignment to that variable.

Figure 4:
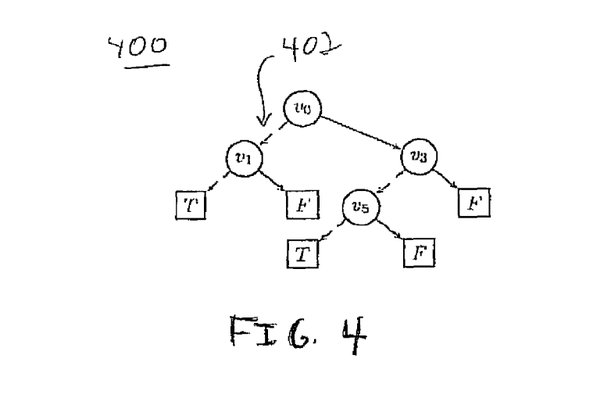
FIG. 4 is a decision tree over Boolean variable (v) employed to learn a Boolean function to describe preconditions in accordance with the present principles.

Referring to FIG. 4, a decision tree 400 for Boolean decision variables $v_0, \ldots, v_5$ is illustratively shown. FIG. 4 is a decision tree over Boolean variables. The dashed edges denote "true" assignments to their parents, whereas the solid edges denote the "false" assignments. Each branch represents a set of truth assignments to the variables. For example, a branch 402 assigns variables $v_0$, $v_1$ to T while leaving the other variables unassigned. In effect, this branch 402 represents 16 different truth assignments corresponding to all possible assignments to the variables that do not occur in the branch. All these assignments share the same outcome (T). The decision tree 400 represents the Boolean function: $(v_0 \Rightarrow v_1) \wedge v_3 \wedge v_5$.

Decision trees described here correspond to Binary Decision Diagrams (BDDs) that have been used widely in numerous applications including circuit design and verification. They represent many (though not all) Boolean functions succinctly and are easy to operate upon. Given a decision tree, we may readily express it in the form of a Boolean formula.

Figure 5:
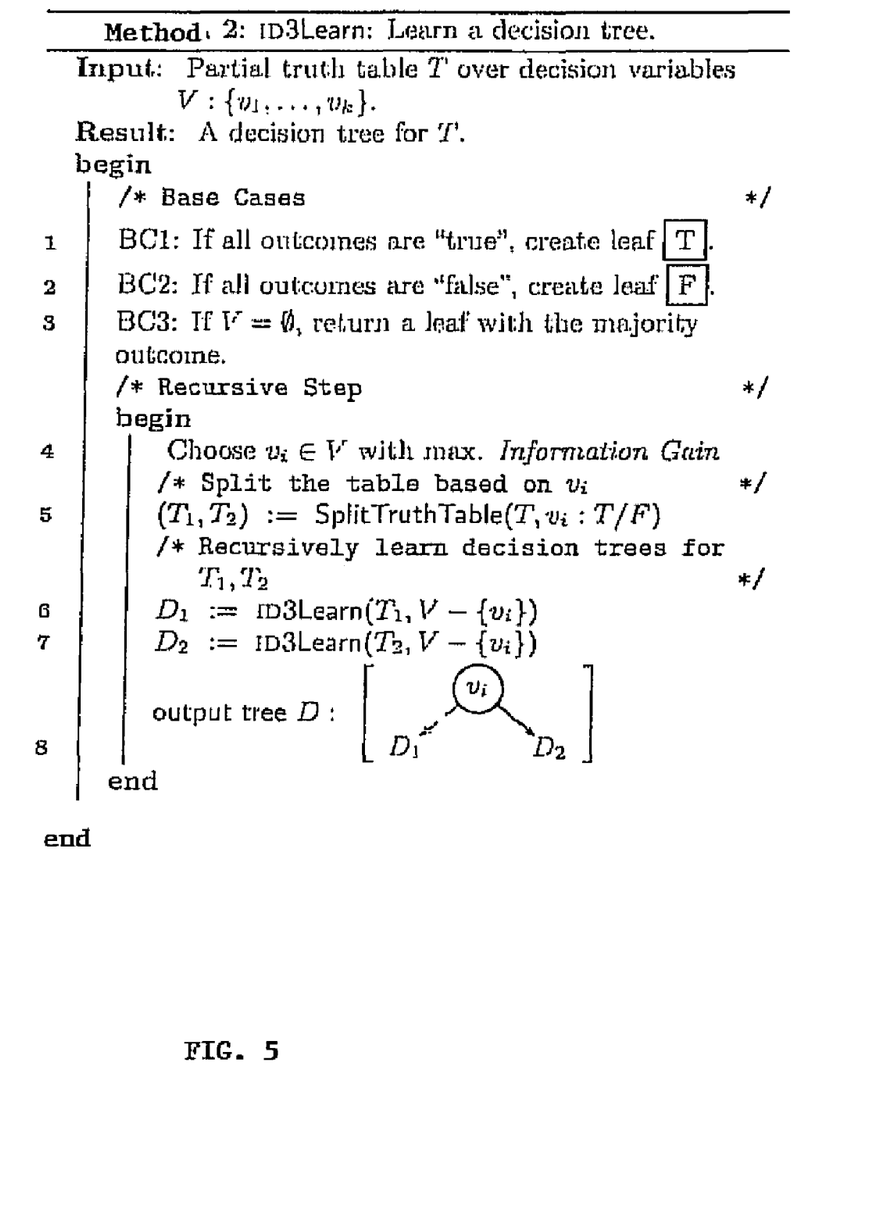
FIG. 5 shows an illustrative method for decision tree learning based on ID3Learn to learn a Boolean function to describe preconditions in accordance with one embodiment.

Decision Tree Learning: We now infer decision trees from a partial truth table mapping truth assignments of the decision variables to their outcomes. One approach to learn decision trees uses the ID3 (Iterative Dichotomizer 3) learning method shown in FIG. 5. FIG. 5 shows the ID3 method in detail. The method of FIG. 5 is recursive, with the base case occurring when all the outcomes are the same, or there are no decision variables left to split upon. During the recursive step, we choose a decision variable $v_i$ to split upon. This variable is chosen based on a "information gain" heuristic (line 4). Once a variable is chosen, the current truth table is split into two subsets, one corresponding to $v_i$: T and the other to $v_i$: F. After learning a decision tree recursively on each of the subtables, we merge them by adding a decision node based on $v_i$ at the root.

Information Gain Heuristic: The choice of a variable to split the current truth table T is based on a metric called the "information-gain". Informally, let p be the number of outcomes that are labeled true and n be the number labeled false. The entropy measure of the truth table is defined as $$I(p, n) = -\frac{p}{p+n}\log\left(\frac{p}{p+n}\right) - \frac{n}{p+n}\log\left(\frac{n}{p+n}\right).$$

The entropy measure is close to zero when all the outcomes in the tree are uniformly true or uniformly false. Let $T_1, T_2$ be the truth tables produced by splitting on the case $v_i$=true or $v_i$=false, respectively. Let $p_1$, $n_1$ be the number of true, false outcomes in $T_1$ and similarly, $p_2$, $n_2$ for $T_2$. The information gain by splitting on the variable $v_i$ is given by:

$$\text{Gain}(v_i) = I(p, n) - \sum_{k=1,2} \frac{p_k + n_k}{p+n} I(p_k, n_k).$$

In other words, it is the difference between the entropy measure of the table and the weighted means of the entropies of the tables $T_1$, $T_2$. The ID3 method splits on that variable $v_i$ for which $\text{Gain}(v_j)$ is maximum.

Having described preferred embodiments of a system and method for dynamically inferring data preconditions over predicates by tree learning (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for inferring preconditions for procedures in a program, comprising:
   formulating predicates based on inputs to a procedure, including formal arguments, global variables and external environment;
   sampling truth assignments to the predicates to provide truth assignments that lead to a feasible set of input values;
   generating test cases for testing the program in accordance with the truth assignments having feasible sets of input values; and
   classifying the truth assignments to the predicates as providing an error or not providing an error;
   wherein the sampling includes random sampling of the truth assignments to the predicates, and the random sampling includes employing a randomized satisfiability solver in combination with a theory solver.

2. The method as recited in claim 1, wherein formulating predicates includes instrumenting the program with variables to track properties of the program during execution.

3. The method as recited in claim 2, wherein the predicates are derived from instrumented variables and program variables.

4. The method as recited in claim 1, wherein sampling includes selecting a previously unseen truth assignment to the predicates and determining its satisfiability.

5. The method as recited in claim 1, further comprising generating a truth table based upon test outcomes.

6. The method as recited in claim 1, further comprising applying a tree learning method to the test outcomes to infer preconditions on the inputs of the procedure.

7. A computer readable medium comprising a computer readable program, wherein the computer readable program when executed on a computer causes the computer to perform the steps as recited in claim 1.

8. A method for inferring preconditions for procedures in a program, comprising:
   instrumenting a program with variables to track properties of the program to formulate predicates which are derived from the variables and based on inputs to a procedure, including formal arguments, global variables and external environment;
   repeatedly sampling truth assignments to the predicates to provide truth assignments that lead to a feasible set of input values obtained by solving a satisfiability problem corresponding to a chosen truth assignment;
   generating test cases for testing the program in accordance with the truth assignments having the feasible sets of input values;
   classifying the truth assignments to the predicates as providing an error or not providing an error; and
   inferring preconditions on the inputs to the procedure based upon classified truth assignments;
   wherein sampling includes random sampling of the truth assignments to the predicates and the random sampling includes employing a randomized satisfiability solver in combination with a theory solver.

9. The method as recited in claim 8, further comprising generating a truth table based upon test outcomes.

10. The method as recited in claim 8, further comprising applying a tree learning method to the test outcomes to infer the preconditions on the inputs of the procedure.

11. A computer readable medium comprising a computer readable program, wherein the computer readable program when executed on a computer causes the computer to perform the steps as recited in claim 8.

12. A system implemented on computer readable medium comprising a computer readable program for inferring preconditions for procedures in a program, comprising:
   a program instrumenter configured to instrument a program with variables to track properties of the program to formulate predicates which are derived from the variables and based on inputs to a procedure, including formal arguments, global variables and external environment;
   a satisfiability solver and theory solver employed in combination to randomly sample truth assignments to the predicates to provide truth assignments that lead to a feasible set of input values;
   a test case generator configured to test the program in accordance with the truth assignments having the feasible sets of input values and to classify the truth assignments to the predicates as providing an error or not providing an error; and
   a decision tree learning method configured to infer preconditions on the inputs to the procedure based upon classified truth assignments.

13. The system as recited in claim 12, wherein the satisfiability solver and theory solver include a satisfiability formula which determines satisfiability for satisfiability problems in the program.

14. The system as recited in claim 12, further comprising a truth table generated based upon test outcomes.

15. The system as recited in claim 12, wherein the tree learning method includes an iterative dichotomizer.

16. The system as recited in claim 12, wherein the tree learning method learns a Boolean function that predicts error-free execution.

* * * * *